United States Patent
Beg et al.

(10) Patent No.: US 12,032,955 B2
(45) Date of Patent: Jul. 9, 2024

(54) DEVELOPMENT-TIME CONFIGURATION CHANGE RECOMMENDATION USING DEPLOYMENT TEMPLATES

(71) Applicant: Microsoft Technology Licensing, LLC, Redmond, WA (US)

(72) Inventors: Mirza Shadab Beg, Redmond, WA (US); Faisal Nasir, Redmond, WA (US); Damon Gray, Kirkland, WA (US); Eman Helmy Morsy Shaheen, Redmond, WA (US); Robert Beneson, Woodinville, WA (US); Nevedita Mallick, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 17/973,416

(22) Filed: Oct. 25, 2022

(65) Prior Publication Data

US 2024/0134634 A1  Apr. 25, 2024

(51) Int. Cl.
  *G06F 9/44*  (2018.01)
  *G06F 8/60*  (2018.01)
  *G06F 8/71*  (2018.01)

(52) U.S. Cl.
  CPC . *G06F 8/71* (2013.01); *G06F 8/60* (2013.01)

(58) Field of Classification Search
  None
  See application file for complete search history.

(56) References Cited

U.S. PATENT DOCUMENTS

| | | | |
|---|---|---|---|
| 9,641,388 B2* | 5/2017 | Kripalani | G06F 8/61 |
| 10,972,548 B2* | 4/2021 | Naylor | G06F 8/60 |
| 2007/0168965 A1* | 7/2007 | Zenz | G06F 9/44505 717/121 |
| 2011/0225579 A1* | 9/2011 | Khandelwal | G06F 8/60 717/177 |
| 2017/0024396 A1* | 1/2017 | Adarsh | G06F 8/60 |
| 2018/0018154 A1* | 1/2018 | Burns | G06F 8/61 |

\* cited by examiner

*Primary Examiner* — Qamrun Nahar
(74) *Attorney, Agent, or Firm* — Wade IP Law PLLC

(57) ABSTRACT

Techniques are described herein that are capable of providing a development-time configuration change recommendation using deployment templates. During development of a software program, a proposed configuration of the software program is identified. A reference configuration defined by a reference template is determined based on a similarity between the proposed configuration and the reference configuration. A determination is made that the proposed configuration has an attribute having a first value corresponding to a first cost. A determination is made that the reference configuration has the attribute having a second value corresponding to a second cost. During the development of the software program, an action is performed, including causing a recommendation to be provided via a user interface, based at least on the second cost being less than the first cost. The recommendation recommends changing the attribute of the proposed configuration to have the second value in lieu of the first value.

20 Claims, 9 Drawing Sheets

```
example template file - {
  "$schema": "https://example.azure.com/schemas/deploymentTemplate.json#",
  "contentVersion": "1.0.0.0",
  "parameters": {
    "StorageAccountName": {
      "type": "string"
    }
  },                                    ← 902
  "functions": [],
                                        ← 904
  "variables": {},
                                        ← 906
  "resources": [

{
                                                    ← 908
      "name": "[parameters('StorageAccountName')]",
                                                    ← 910
      "type": "Microsoft.Storage/storageAccounts",
                                        ← 912
      "apiVersion": "2022-01-01",
                          ← 914
      "tags": {},
                                            ← 916
      "location": "[resourceGroup().location]",
                              ← 918
      "kind": "StorageV2",
                        ← 920
      "sku": {
                                  ← 922
        "name": "Standard_LRS",
                              ← 924
        "tier": "Standard"

},
                        ← 926
      "properties": {}
```

FIG. 9

DEVELOPMENT-TIME CONFIGURATION CHANGE RECOMMENDATION USING DEPLOYMENT TEMPLATES

BACKGROUND

Enterprises and startups have greatly accelerated their digital transformation through investment and adoption of the cloud. While the cloud offers seemingly endless opportunities for bringing value to enterprise customers, partners, and employees through a pay-as-you-go model, many enterprises and startups are realizing the need for proactive capabilities to manage the cost of running service and infrastructure in the cloud in an efficient manner to remain competitive and successful.

For instance, a developer in an enterprise may configure a software program to utilize a desired amount of resources of a cloud service without an understanding of the cost associated with the configuration. Some cloud services notify the enterprise of potential cost-saving measures after the software program has been deployed in the cloud. However, by the time the enterprise receives the notification, the enterprise has already incurred the cost of deploying the software program with the desired configuration. For instance, by deploying the software program, the resources indicated by the desired configuration typically are automatically deployed. Accordingly, the developer may be unaware of the cost of the desired configuration and/or the potential cost-saving measures until after the cost has been incurred by deploying the software program in the cloud. Moreover, changing the configuration of the software program after deployment to take advantage of the cost-saving measures may be costly and/or impose a burden on the enterprise.

SUMMARY

Many enterprises are investing in reactive and intelligent first-party solutions or buying third-party solutions to optimize the cost of running their cloud footprint of services. However, the impact of the existing optimization solutions is available in the last stage of the engineering cycle when changes are published to customer environments. An intelligent and automated solution may be provided based on shifting the impact of the solution earlier in the engineering cycle, enabling enterprises to have cost observability early in the cycle.

For instance, it may be desirable to provide a recommendation to change a deployment configuration of a software program (e.g., a virtual machine or software built on a cloud platform-as-a-service (PaaS) service or a cloud software-as-a-service (SaaS) service) during development-time of the software program in order to reduce a cost associated with deploying the software program in the cloud. By comparing a proposed deployment configuration of the software program and reference deployment configuration(s) that are similar to the proposed deployment configuration, difference(s) between the proposed deployment configuration and the reference deployment configuration(s) may reveal an opportunity to reduce the cost. For instance, an incremental cost may be associated with each attribute of the proposed deployment configuration and the reference deployment configuration(s) based on a value of each attribute. By comparing the values of the attributes in the proposed deployment configuration and the reference deployment configuration(s) and the incremental cost associated with each value, it may be determined that one or more of the reference deployment configuration(s) includes an attribute having a value with an incremental cost that is less than the incremental cost of a value of the attribute in the proposed deployment configuration. A recommendation may be provided to change the value of the attribute in the proposed deployment configuration to an updated value that is based on the value of the attribute in the one or more reference deployment configuration(s).

Various approaches are described herein for, among other things, providing a development-time configuration change recommendation using deployment templates. A deployment template defines a deployment configuration of a software program. A deployment configuration of a software program is a configuration of the software program that is to be employed during deployment of the software program. For instance, the deployment configuration may indicate (e.g., define) a configuration of cloud resources that are to be deployed for use by the software program. In an example approach, during development of a software program, a proposed deployment configuration of the software program is identified. A reference deployment configuration, which is defined by a reference deployment template, is determined based on a similarity between the proposed deployment configuration and the reference deployment configuration satisfying a similarity criterion. A determination is made that the proposed deployment configuration has an attribute having a first value corresponding to a first cost. A determination is made that the reference deployment configuration has the attribute having a second value corresponding to a second cost that is less than the first cost. During the development of the software program, an action is performed based on the second cost being less than the first cost. Performing the action includes causing a recommendation to be provided via a user interface. The recommendation recommends changing the attribute of the proposed deployment configuration to have the second value in lieu of the first value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 9 depicts an example deployment template in accordance with an embodiment.

Figure 1:
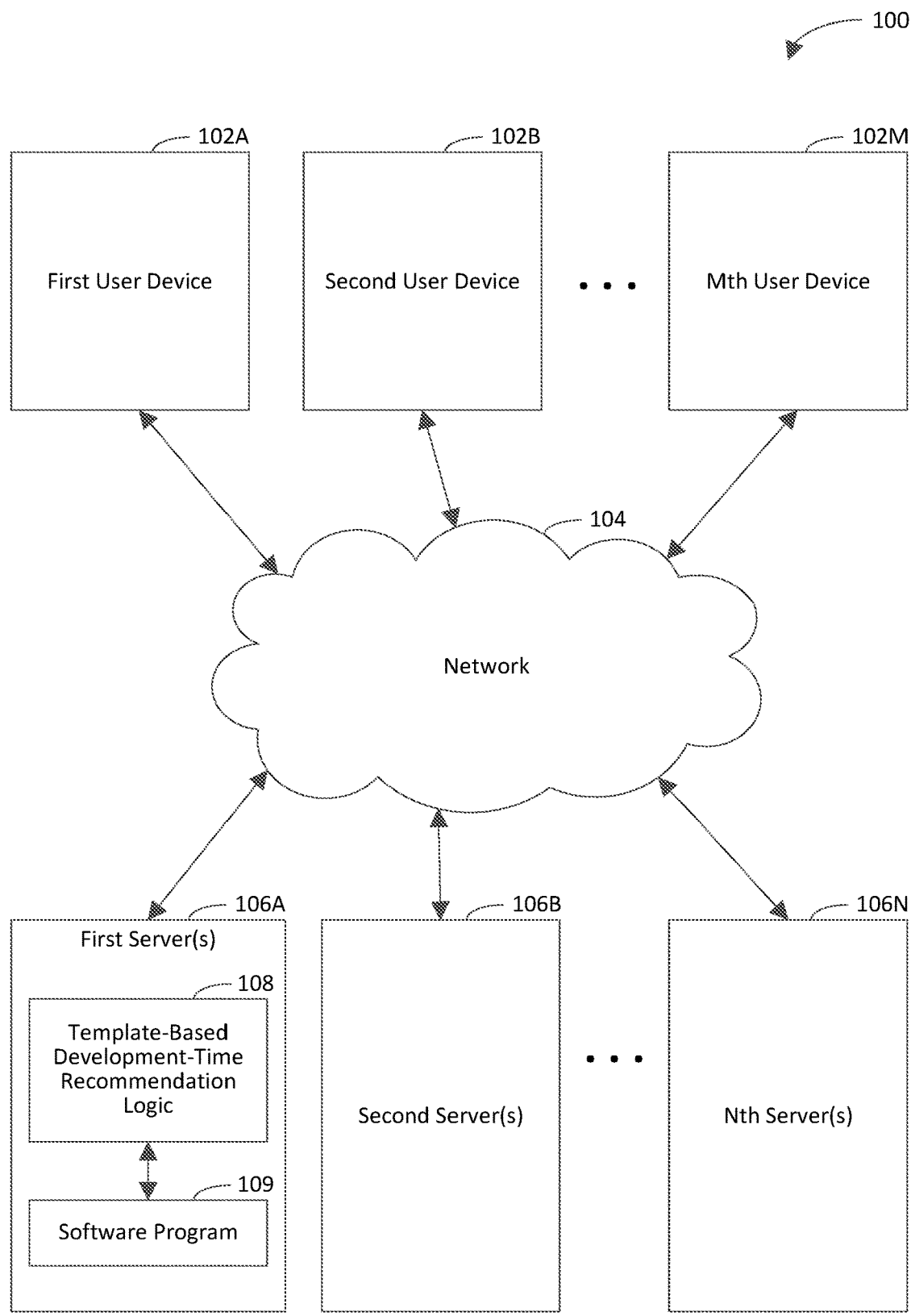
FIG. 1 is a block diagram of an example deployment template-based development-time recommendation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

Many enterprises are investing in reactive and intelligent first-party solutions or buying third-party solutions to optimize the cost of running their cloud footprint of services. However, the impact of the existing optimization solutions is available in the last stage of the engineering cycle when changes are published to customer environments. An intelligent and automated solution may be provided based on shifting the impact of the solution earlier in the engineering cycle, enabling enterprises to have cost observability early in the cycle.

For instance, it may be desirable to provide a recommendation to change a deployment configuration of a software program (e.g., a virtual machine or software built on a cloud platform-as-a-service (PaaS) service or a cloud software-as-a-service (SaaS) service) during development-time of the software program in order to reduce a cost associated with deploying the software program in the cloud. By comparing a proposed deployment configuration of the software program and reference deployment configuration(s) that are similar to the proposed deployment configuration, difference(s) between the proposed deployment configuration and the reference deployment configuration(s) may reveal an opportunity to reduce the cost. For instance, an incremental cost may be associated with each attribute of the proposed deployment configuration and the reference deployment configuration(s) based on a value of each attribute. By comparing the values of the attributes in the proposed deployment configuration and the reference deployment configuration(s) and the incremental cost associated with each value, it may be determined that one or more of the reference deployment configuration(s) includes an attribute having a value with an incremental cost that is less than the incremental cost of a value of the attribute in the proposed deployment configuration. A recommendation may be provided to change the value of the attribute in the proposed deployment configuration to an updated value that is based on the value of the attribute in the one or more reference deployment configuration(s).

Example embodiments described herein are capable of providing a development-time configuration change recommendation using deployment templates. A deployment template defines a deployment configuration of a software program. A deployment configuration of a software program is a configuration of the software program that is to be employed during deployment of the software program. For instance, the deployment configuration may indicate (e.g., define) a configuration of cloud resources that are to be deployed for use by the software program. In an example embodiment, during development of a software program, a proposed deployment configuration of the software program is identified. A reference deployment configuration, which is defined by a reference deployment template, is determined based on a similarity between the proposed deployment configuration and the reference deployment configuration satisfying a similarity criterion. A determination is made that the proposed deployment configuration has an attribute having a first value corresponding to a first cost. A determination is made that the reference deployment configuration has the attribute having a second value corresponding to a second cost that is less than the first cost. During the development of the software program, an action is performed based on the second cost being less than the first cost. Performing the action includes causing a recommendation to be provided via a user interface. The recommendation recommends changing the attribute of the proposed deployment configuration to have the second value in lieu of the first value.

Example techniques described herein have a variety of benefits as compared to conventional techniques for reducing a cost of deploying a software program in the cloud. For instance, the example techniques are capable of causing a recommendation to change a deployment configuration of a software program to be provided during development-time of the software program. By causing the recommendation to be provided during development-time, a user is given an opportunity to change the deployment configuration and therefore reduce the cost of deployment prior to the deployment of the software program. Implementing the recommended change during development-time may be substantially easier than implementing the recommended change after the software program has been deployed during production. The risk of a negative effect resulting from making changes to the software program after the software program has been deployed in production may be substantially higher than the risk of a negative effect resulting from making the changes during the development stage of the software lifecycle.

The example techniques may automate identifying deployment configuration changes that are capable of reducing a cost of deploying a software program in the cloud. Accordingly, the amount of time that is consumed to identify the aforementioned deployment configuration changes may be reduced. For instance, the example techniques may automatically identify reference deployment configuration(s) that are similar to a proposed deployment configuration of the software program, automatically compare the aforementioned deployment configurations, and automatically determine change(s) that can be made to the proposed deployment configuration to reduce the cost of deploying the software program in the cloud. A user experience of an information technology (IT) professional who is tasked with configuring the software program may be increased, for example, by obviating a need for the IT professional to perform operations manually to identify cost-reducing deployment configuration changes. By eliminating a need for the IT professional to perform operations manually, a cost of configuring the software program may be reduced. For instance, time spent by an IT professional to perform manual operations has an associated cost. By eliminating the manual operations, the cost of configuring the software program can be reduced by the labor cost associated with the IT professional performing the manual operations.

The example techniques may reduce an amount of time and/or resources (e.g., processor cycles, memory, network bandwidth) that is consumed to configuring a software program. For instance, by causing a recommendation of a deployment configuration change to be provided during development-time of the software program, the time and/or resources that would have been consumed by an IT professional to identify the deployment configuration change manually is reduced (e.g., avoided). By reducing the amount of time and/or resources that is consumed by a computing system to configuring the software program, the efficiency of the computing system may be increased.

FIG. 1 is a block diagram of an example template-based development-time recommendation system 100 in accordance with an embodiment. Generally speaking, the template-based development-time recommendation system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the template-based development-time recommendation system 100 provides a development-time configuration change recommendation using deployment templates. Detail regarding techniques for providing a development-time configuration change recommendation using deployment templates is provided in the following discussion.

As shown in FIG. 1, the template-based development-time recommendation system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the template-based development-time recommendation system 100.

One example type of computer program that may be executed by one or more of the servers 106A-106N is a developer tool. A developer tool is a computer program that performs diagnostic operations (e.g., identifying source of problem, debugging, profiling, controlling, etc.) with respect to program code. Examples of a developer tool include but are not limited to an integrated development environment (IDE) and a web development platform. Examples of an IDE include but are not limited to Microsoft Visual Studio® IDE developed and distributed by Microsoft Corporation; AppCode® IDE, PhpStorm® IDE, Rider® IDE, WebStorm® IDE, etc. developed and distributed by JetBrains s.r.o.; JDeveloper® IDE developed and distributed by Oracle International Corporation; NetBeans® IDE developed and distributed by Sun Microsystems, Inc.; Eclipse™ IDE developed and distributed by Eclipse Foundation; and Android Studio™ IDE developed and distributed by Google LLC and JetBrains s.r.o. Examples of a web development platform include but are not limited to Windows Azure® platform developed and distributed by Microsoft Corporation; Amazon Web Services® platform developed and distributed by Amazon.com, Inc.; Google App Engine® platform developed and distributed by Google LLC; VMWare® platform developed and distributed by VMWare, Inc.; and Force-.com® platform developed and distributed by Salesforce, Inc. It will be recognized that the example techniques described herein may be implemented using a developer tool.

Another example type of a computer program that may be executed by one or more of the servers 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network. The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include template-based development-time recommendation logic 108 and a software program 109 for illustrative purposes. The template-based development-time recommendation logic 108 is configured to recommend a change to a deployment configuration of the software program 109 during development-time of the software program 109 using deployment templates. For instance, during development of the software program 109, the template-based development-time recommendation logic 108 identifies a proposed deployment configuration of the software program 109. The template-based development-time recommendation logic 108 determines a reference deployment configuration, which is defined by a reference deployment template, based on a similarity between the proposed deployment configuration and the reference deployment configuration satisfying a similarity criterion. The template-based development-time recommendation logic 108 determines that the proposed deployment configuration has an attribute having a first value corresponding to a first cost. The template-based development-time recommendation logic 108 determines that the reference deployment configuration has the attribute having a second value corresponding to a second cost that is less than the first cost. During the development of the software program 109, the template-based development-time recommendation logic 108 performs an action based on the second cost being less than the first cost. Performing the action includes causing a recommendation to be provided via a user interface. The recommendation recommends changing the attribute of the proposed deployment configuration to have the second value in lieu of the first value.

The template-based development-time recommendation logic 108 may use machine learning to perform at least some of its operations. For instance, the template-based development-time recommendation logic 108 may use the machine learning to analyze (e.g., develop and/or refine an understanding of) the proposed deployment configuration of the software program 109, costs associated with values of attributes of the proposed deployment configuration, reference deployment configuration(s), costs associated with values of attributes of the reference deployment configuration(s), relationships between the proposed deployment configuration and the reference deployment configuration(s), and confidences in those relationships. For example, the template-based development-time recommendation logic 108 may use the machine learning to compare values of attributes of the proposed deployment configuration and values of attributes of the reference deployment configuration(s) to determine whether a similarity between the proposed deployment configuration and each of the reference deployment configuration(s) satisfies a similarity criterion.

In some example embodiments, the template-based development-time recommendation logic 108 uses a neural network to perform the machine learning to determine (e.g., predict) relationships between the proposed deployment configuration and the reference deployment configuration(s) and confidences in the relationships. The template-based development-time recommendation logic 108 uses those relationships to determine whether a change to the proposed deployment configuration is capable of reducing a cost of deploying the software program 109 in the cloud. For instance, a value of each attribute of the proposed deployment configuration may be compared to a value of the respective attribute of each reference deployment configuration to determine similarities and differences between the values of the attributes of the proposed deployment configuration and the values of the attributes of the reference deployment configuration(s); each reference deployment configuration that is similar to the proposed deployment configuration may be determined based on the similarities and differences between the values of the attributes of the proposed deployment configuration and the values of the attributes of the reference deployment configuration(s); and a change to the proposed deployment configuration that is capable of reducing the cost of deploying the software program 109 in the cloud may be determined based on differences between the values of the attributes of the proposed deployment configuration and the values of the attributes of the reference deployment configuration(s) that are similar to the proposed deployment configuration and further based on the costs associated with those values.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the template-based development-time recommendation logic 108 employs a feed forward neural network to train the machine learning model 116, which is used to determine ML-based confidences. Such ML-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates a recommendation model (e.g., to generate recommendations of deployment configuration changes) by utilizing information, such as the proposed deployment configuration of the software program 109, costs associated with values of attributes of the proposed deployment configuration, reference deployment configuration(s), costs associated with values of attributes of the reference deployment configuration(s), relationships between the proposed deployment configuration and the reference deployment configuration(s), and ML-based confidences that are derived therefrom.

In example embodiments, the template-based development-time recommendation logic 108 includes training logic and inference logic. The training logic is configured to train a machine learning algorithm that the inference logic uses to determine (e.g., infer) the ML-based confidences. For instance, the training logic may provide sample proposed deployment configurations of software programs, sample costs associated with values of attributes of the sample proposed deployment configurations, sample reference deployment configurations, and sample costs associated with values of attributes of the sample reference deployment configurations as inputs to the algorithm to train the algorithm. The sample data may be labeled. The machine learning algorithm may be configured to derive relationships between the features (e.g., values of attributes of the proposed deployment configuration of the software program 109, costs associated with the values of the attributes of the proposed deployment configuration, values of attributes of reference deployment configuration(s), costs associated with the values of the attributes of the reference deployment configuration(s)) and the resulting ML-based confidences. The inference logic is configured to utilize the machine learning algorithm, which is trained by the training logic, to determine the ML-based confidence when the features are provided as inputs to the algorithm.

The template-based development-time recommendation logic 108 may be implemented in various ways to recommend a change to a deployment configuration of the software program 109 during development-time of the software program 109 using deployment templates, including being implemented in hardware, software, firmware, or any combination thereof. For example, the template-based development-time recommendation logic 108 may be implemented as computer program code configured to be executed in one or more processors. In another example, at least a portion of the template-based development-time recommendation logic 108 may be implemented as hardware logic/electrical circuitry. For instance, at least a portion of the template-based development-time recommendation logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the template-based development-time recommendation logic 108 may be (or may be included in) a developer tool and/or a cloud computing program, though the scope of the example embodiments is not limited in this respect.

The template-based development-time recommendation logic 108 and the software program 109 are shown to be incorporated in the first server(s) 106A for illustrative purposes and are not intended to be limiting. It will be recognized that the template-based development-time recommendation logic 108 (or any portion(s) thereof) may be incorporated in any one or more of the servers 106A-106N, any one or more of the user devices 102A-102M, or any combination thereof. For example, client-side aspects of the template-based development-time recommendation logic 108 may be incorporated in one or more of the user devices 102A-102M, and server-side aspects of template-based development-time recommendation logic 108 may be incorporated in one or more of the servers 106A-106N. It will be further recognized that the software program 109 (or any portion(s) thereof) may be incorporated in any one or more of the servers 106A-106N, any one or more of the user devices 102A-102M, or any combination thereof.

Figure 2:
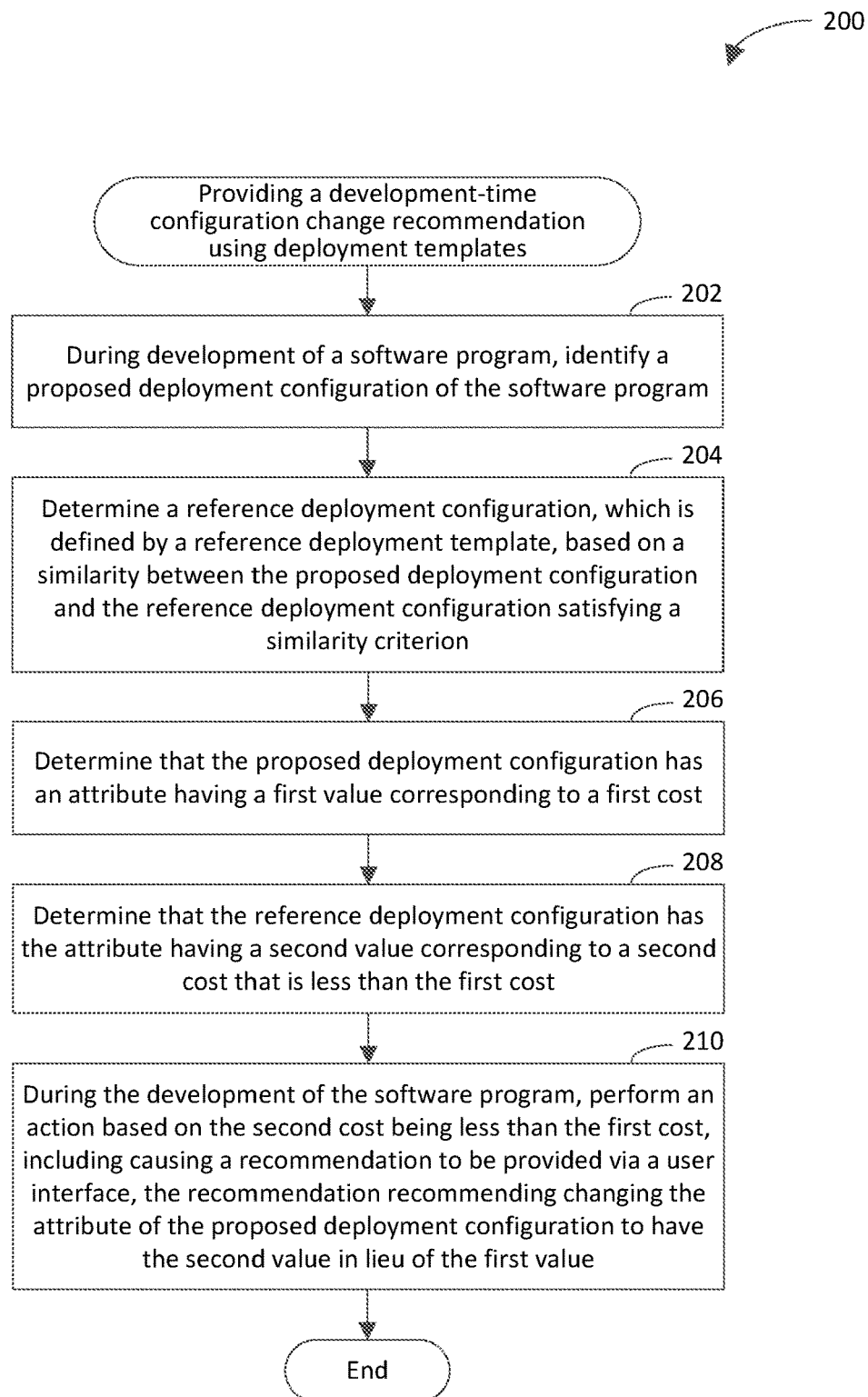
FIGS. 2 and 7 depict flowcharts of example methods for providing a development-time configuration change recommendation using deployment templates in accordance with embodiments.
Figure 3:
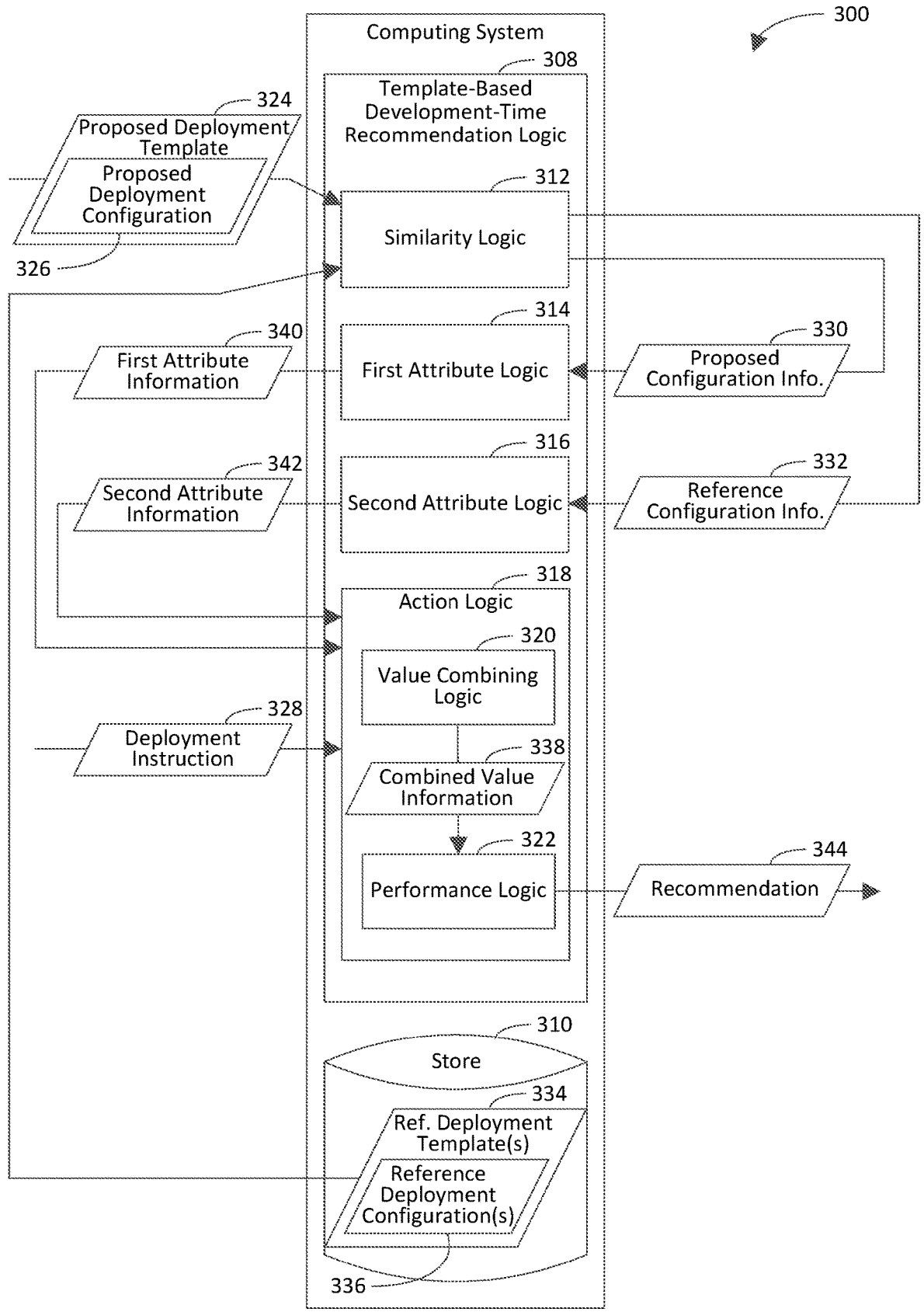
FIG. 3 is a block diagram of an example computing system in accordance with an embodiment.

FIG. 2 depicts a flowchart 200 of an example method for providing a development-time configuration change recommendation using deployment templates in accordance with an embodiment. Flowchart 200 may be performed by the first server(s) 106A shown in FIG. 1, for example. For illustrative purposes, flowchart 200 is described with respect to computing system 300 shown in FIG. 3, which is an example implementation of the first server(s) 106A. As shown in FIG. 3, the computing system 300 includes template-based development-time recommendation logic 308 and a store 310. The template-based development-time recommendation logic 408 includes similarity logic 312, first attribute logic 314, second attribute logic 316, and action logic 318. The action logic 318 includes value combining logic 320 and performance logic 322. The store 310 may be any suitable type of store. One type of store is a database. For instance, the store 310 may be a relational database, an entity-relationship database, an object database, an object relational database, an extensible markup language (XML) database, etc. The store 310 is shown to store reference deployment template(s) 334, which define respective reference deployment configuration(s) 336, for non-limiting, illustrative purposes. Further structural and operational embodiments will be apparent to persons skilled in the relevant art(s) based on the discussion regarding flowchart 200.

As shown in FIG. 2, the method of flowchart 200 begins at step 202. In step 202, during development of a software program, a proposed deployment configuration of the software program is identified. The proposed deployment configuration defines a state of the software program. For example, the proposed deployment configuration may include values of respective attributes of the software program that define the state. In accordance with this example, the values of the respective attributes may indicate a workload of the software program and/or one or more requirements of the software program (e.g., regarding resources of a cloud service). The workload indicates an extent to which the software program is used by users. The requirements may indicate amounts of cloud resources that are to be available for use by the software program. For instance, any one or more of the requirements may indicate an amount of a particular type of cloud resource that is to be available for use by the software program.

Examples of a requirement of the software program include but are not limited to a value of any of the following attributes: availability, concurrency, performance, reliability, scalability, a deployment criterion, a program type, a user region, a transaction limit, a storage limit, a cache limit, resource dedication, and payment tier. The value of the availability attribute indicates a minimum proportion of the time that the software program is available (i.e., capable of responding to an input from a user). For instance, the value of the availability attribute may indicate that the software program must be available 99%, 99.999%, or 99.99999% of the time. The value of the concurrency attribute indicates a maximum number of users that are allowed to use the software program at a time (e.g., on average). For instance, the value of the concurrency attribute may indicate that 1,000, 10,000, 20,000, or 100,000 users are allowed to use the software program at a time. The value of the performance attribute indicates an amount of latency that the software program will exhibit during use by a user. For instance, the value of the performance attribute may indicate that the software program will respond to a command (e.g., load) in 1-10 milliseconds (ms), 50-100 ms, or 0.5-1.0 seconds.

The value of the reliability attribute indicates a minimum probability that the software program successfully performs an operation in response to an instruction that instructs the software program to perform the operation. For instance, the value of the reliability attribute may indicate that the minimum probability is 99%, 99.9%, or 99.99%. The value of the scalability attribute indicates a maximum amount of work that the software program is capable of supporting by utilizing additional resources (e.g., cloud resources). Examples of a deployment criterion attribute include but are not limited to a container in which the software program is to be deployed and a region in which the software program is to be deployed. For instance, the region may be a city, county, state, geographic portion of a country (e.g., north, east, south, or west), a country, or a collection of countries (e.g., Europe, Asia, or the Middle East). The program type attribute indicates a type of the software program (e.g., a web application or a standalone component Windows® application).

The customer region attribute indicates a region in which users of the software program are located. The value of the transaction limit attribute indicates a maximum number of transactions that the software program is capable of processing (e.g., allowed to process) per month (e.g., 10,000, 40,000, or 100,000 transactions/month). The value of the storage limit attribute indicates a maximum amount of storage that the software program is capable of utilizing at a time (e.g., 10 gigabytes (GB) or 2 terabytes (TB)). The value of the cache limit attribute indicates a maximum amount of cache that the software program is capable of utilizing at a time (e.g., 500 megabytes (MB) or 1 GB). The value of the resource dedication attribute indicates whether the software program has dedicated resources (i.e., resources that are dedicated for use by the software program) or non-dedicated resources (i.e., resources that are not dedicated for use by the software program). In an aspect, the dedicated resources and the non-dedicated resources are cloud resources. The value of the payment tier attribute indicates whether payment for servicing the software program (e.g., providing cloud resources for use by the software program) is on a pay-as-you-go basis or a use-it-or-lose-it basis. For instance, a monthly payment under a pay-as-you-go payment tier may fluctuate each month based on an amount of resources (e.g., cloud resources) utilized by the software program during the month. A monthly payment under a use-it-or-lose-it payment tier may be the same amount each month (e.g., regardless of the amount of resources utilized by the software program during the month).

In an example implementation, during development of a software program (e.g., software program 109), the similarity logic 312 identifies a proposed deployment configuration 326 of the software program. For instance, the proposed deployment configuration 326 may be defined by a proposed deployment template 324. In accordance with this implementation, the similarity logic 312 generates proposed configuration information 330, which indicates (e.g., specifies) the values of the respective attributes that are included in the proposed deployment configuration 326.

In an example embodiment, identifying the proposed deployment configuration at step 202 includes reviewing a pre-existing deployment template that defines the proposed deployment configuration of the software program. For instance, the pre-existing deployment template may include default settings and/or user-defined settings that define the proposed deployment configuration.

In another example embodiment, identifying the proposed deployment configuration at step 202 includes presenting a questionnaire, which includes questions requesting information that defines the proposed deployment configuration of the software program. For example, the questions may request a user to select values of respective attributes of the software program. In accordance with this example, each question may request the user to select a value from multiple possible values of a respective attribute. In accordance with this embodiment, identifying the proposed deployment configuration at step 202 further includes reviewing a response to the questionnaire, which includes answers to the questions, the answers including the information that defines the proposed deployment configuration of the software program. For example, the answers may include the value that is selected from the multiple possible values for each attribute.

At step 204, a reference deployment configuration, which is defined by a reference deployment template, is determined based at least on a similarity between the proposed deployment configuration and the reference deployment configuration satisfying a similarity criterion. For example, the reference deployment configuration may include values of respective attributes, such as any one or more of the attributes described above with respect to the proposed deployment configuration. In an example implementation, the similarity logic 312 determines a reference deployment configuration 336, which is defined by a reference deployment template 334, based on a similarity between the proposed deployment configuration 326 and the reference deployment configuration 336 satisfying a similarity criterion. In an aspect of this implementation, the similarity logic 312 retrieves the reference deployment configuration 336 from the store 310 and analyzes the reference deployment configuration to identify values of the respective attributes that are included in the reference deployment configuration 336. In accordance with this aspect, the similarity logic 312 generates reference deployment configuration information 332, which indicates the values of the respective attributes that are included in the reference deployment configuration 336.

At step 206, a determination is made that the proposed deployment configuration has an attribute having a first value corresponding to a first cost. In an example implementation, the first attribute logic 314 determines that the proposed deployment configuration 326 has the attribute having the first value corresponding to the first cost. In accordance with this implementation, the first attribute logic 314 generates first attribute information 340, which indicates the attribute, the first value, and the first cost.

At step 208, a determination is made that the reference deployment configuration has the attribute having a second value corresponding to a second cost that is less than the first cost. In an example implementation, the second attribute logic 316 determines that the reference deployment configuration 336 has the attribute having the second value corresponding to the second cost. In accordance with this implementation, the second attribute logic 316 generates second attribute information 342, which indicates the attribute, the second value, and the second cost.

In an example embodiment, making the determination at step 206 and/or the determination at step 208 automates identifying change(s) to the proposed deployment configuration that are capable of reducing a cost of deploying the software program in the cloud. In another example embodiment, making the determination at step 206 and/or the determination at step 208 reduces an amount of time and/or resources that is consumed by a computing system (e.g., computing system 300) to identify change(s) to the proposed deployment configuration that reduce the cost of deploying the software program in the cloud.

At step 210, during the development of the software program, an action is performed based at least on the second cost being less than the first cost. Performing the action at step 210 includes causing a recommendation to be provided via a user interface. The recommendation recommends changing the attribute of the proposed deployment configuration to have the second value in lieu of the first value. For example, the attribute of the proposed deployment configuration may represent a cloud resource of a cloud service. In accordance with this example, the first value may indicate a first amount of the cloud resource that is to be made available to the software program, and the second value may indicate a second amount of the cloud resource that is to be made available to the software program. In further accordance with this example, the first amount is greater than the second amount. Accordingly, in this example, the first cost of the first amount is greater than the second cost of the second amount. In an example implementation, during the development of the software program, the action logic 318 (e.g., performance logic 322 therein) performs the action based at least on the second cost being less than the first cost. For instance, the action logic 318 may compare the first cost, as indicated by the first attribute information 340, and the second cost, as indicated by the second attribute information 342 to determine that the second cost is less than the first cost. In accordance with this implementation, the performance logic 322 causes a recommendation 344 to be provided via the user interface. The recommendation 344 recommends changing the attribute of the proposed deployment configuration 326 to have the second value in lieu of the first value.

In an example embodiment, performing the operation at step 210 reduces a cost of deploying the software program in the cloud. In another example embodiment, performing the operation at step 210 reduces an amount of time and/or resources that is consumed by a computing system (e.g., computing system 300) to configure the software program. In yet another example embodiment, performing the operation at step 210 increases efficiency of the computing system that is used to configure the software program.

In an example embodiment, performing the action at step 210 includes causing a notification to be provided via the user interface. The notification specifies an amount of cost to be saved by changing the attribute of the proposed deployment configuration to have the second value in lieu of the first value. In accordance with this embodiment, the amount of cost to be saved is based at least on the first cost minus the second cost. For instance, the amount of the cost may be equal to the first cost minus the second cost.

In another example embodiment, the action is performed at step 210 based at least on a cost of the proposed deployment configuration of the software program being greater than or equal to a user-defined cost threshold.

In yet another example embodiment, the action is performed at step 210 in a context of a developer tool in which the software program is developed. For example, the developer tool may be an IDE or a web development program.

In still another example embodiment, causing the recommendation to be provided at step 210 includes sending the recommendation via a cellular communication channel to be provided via the user interface of a mobile device outside a context of a developer tool in which the software program is developed. A cellular communication channel is a communication channel that is established on a cellular network. A cellular network is a network in which a communication channel between nodes is wireless.

In another example embodiment, causing the recommendation to be provided at step 210 includes sending the recommendation via an email service to be provided via the user interface outside a context of a developer tool in which the software program is developed.

It will be recognized that a cost associated with the proposed deployment configuration of the software program (including costs associated with values of its attributes) may be continuously monitored as the software program is being developed. Accordingly, any one or more of the steps 202, 204, 206, 208, and/or 210 of flowchart 200 may be performed in an iterative manner as a result of the continuous monitoring. For instance, recommendations may be provided throughout the development of the software program based on increases in the cost associated with the proposed deployment configuration that result from respective changes to the proposed deployment configuration.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 further includes detecting an instruction to deploy the proposed deployment configuration of the software program in a production environment. In an example implementation, the action logic 318 detects a deployment instruction 328, which indicates that the proposed deployment configuration 326 of the software program is to be deployed in the production environment (e.g., as opposed to a development environment). In accordance with this implementation, the action is performed at step 210 further based at least on detection of the instruction to deploy the proposed deployment configuration of the software program in the production environment. In an example implementation, the action logic 318 performs the action further based at least on detection of the deployment instruction 328 (e.g., based at least on the deployment instruction 328 indicating that the proposed deployment configuration 326 of the software program is to be deployed in the production environment).

Figure 4:
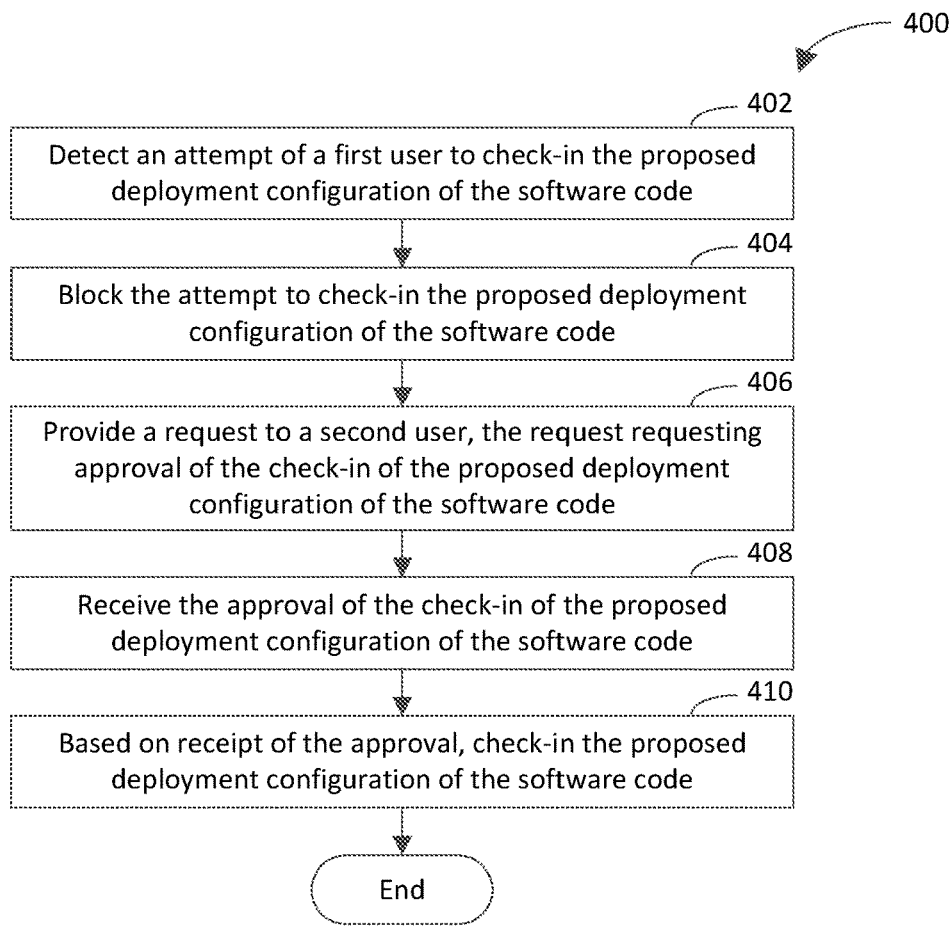
FIGS. 4-5 and 8 depict flowcharts of example methods for performing an action during development of a software program in accordance with embodiments.
Figure 5:
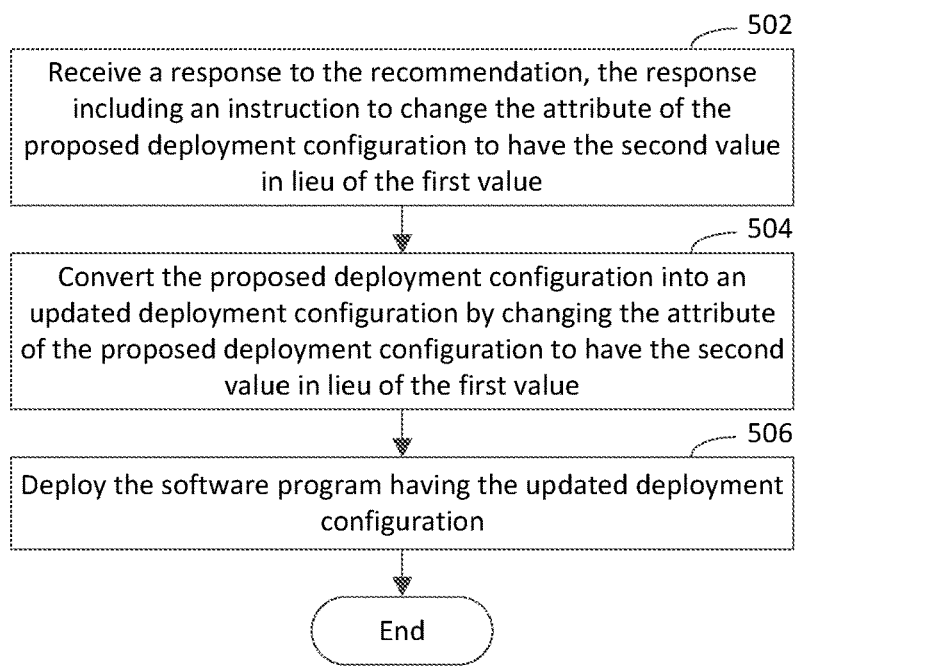
Figure 6:
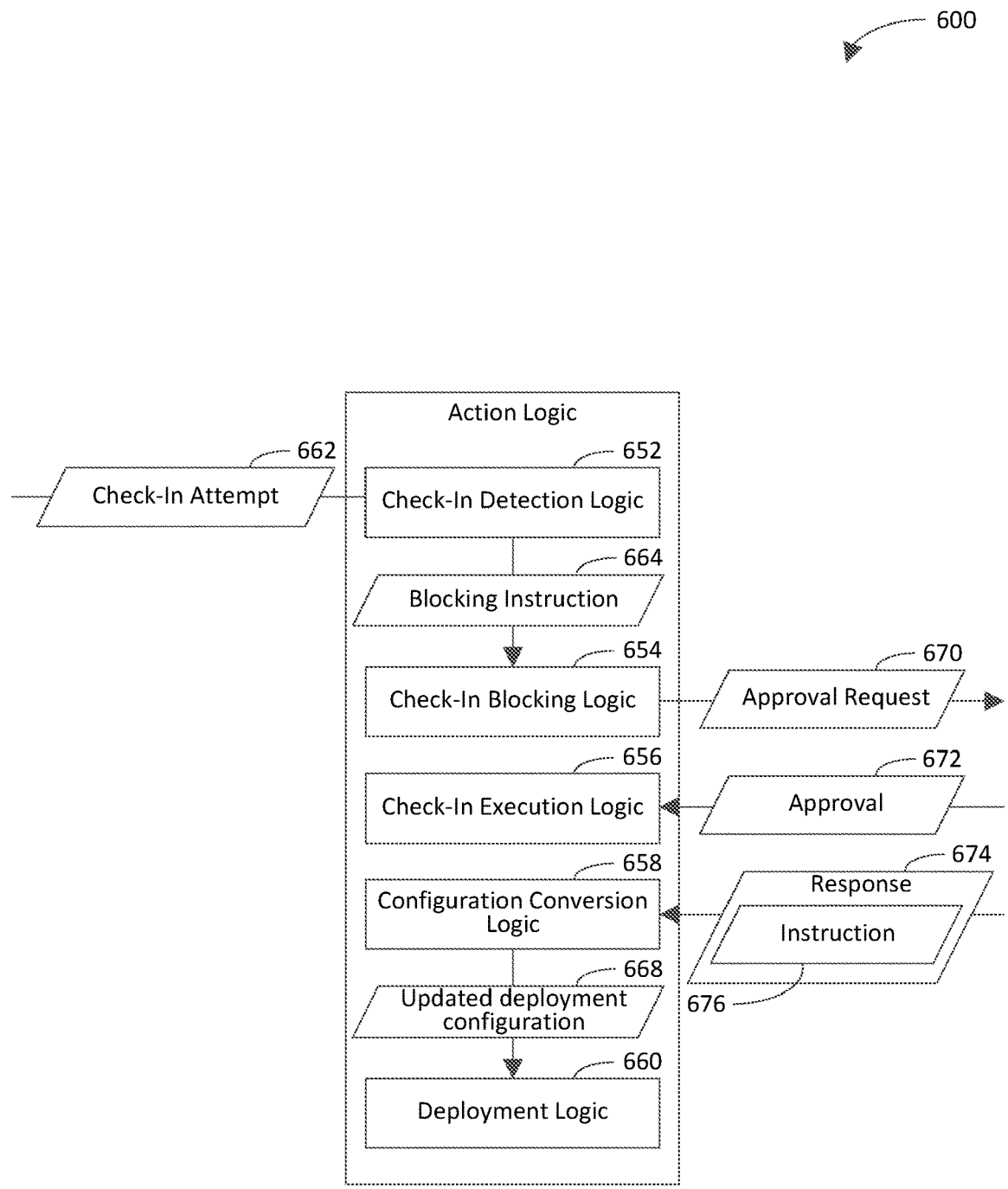
FIG. 6 is a block diagram of an example implementation of action logic shown in FIG. 3 in accordance with an embodiment.

In another example embodiment, performing the action at step 210 further includes one or more of the steps shown in flowchart 400 of FIG. 4 and/or one or more of the steps shown in flowchart 500 of FIG. 5. Flowcharts 400 and 500 may be performed by the action logic 318 shown in FIG. 3, for example. For illustrative purposes, flowcharts 400 and 500 are described with respect to action logic 600 shown in FIG. 6, which is an example implementation of the action logic 318. As shown in FIG. 6, the action logic 600 includes check-in detection logic 652, check-in blocking logic 654, check-in execution logic 656, configuration conversion logic 658, and deployment logic 660. Further structural and operational embodiments will be apparent to persons skilled in the relevant art(s) based on the discussion regarding flowcharts 400 and 500.

As shown in FIG. 4, the method of flowchart 400 begins at step 402. In step 402, an attempt of a first user to check-in the proposed deployment configuration of the software code is detected. In an example implementation, the check-in detection logic 652 detects a check-in attempt 662 of a first user, which attempts to check-in the proposed deployment configuration (e.g., proposed deployment configuration 326) of the software code. The check-in detection logic 652 generates a blocking instruction 664, which indicates that the check-in attempt 662 is to be blocked at least temporarily (e.g., while approval of the check-in attempt is pending).

At step 404, the attempt to check-in the proposed deployment configuration of the software code is blocked. In an example implementation, the check-in blocking logic 654 blocks the check-in attempt 662. For instance, the check-in blocking logic 654 may block the check-in attempt 662 based at least on receipt of the blocking instruction 664 (e.g., based at least on the blocking instruction 664 indicating that the check-in attempt 662 is to be blocked).

At step 406, a request is provided to a second user. The second user is different form the first user. The request requests approval of the check-in of the proposed deployment configuration of the software code. In an example implementation, the check-in blocking logic 654 provides an approval request 670 to the second user regarding the check-in attempt 662. The approval request 670 requests approval 672 of the check-in from the second user.

At step 408, the approval of the check-in of the proposed deployment configuration of the software code is received. In an example implementation, the check-in execution logic 656 receives the approval 672 of the check-in from the second user.

At step 410, based at least on receipt of the approval, the proposed deployment configuration of the software code is checked-in. In an example implementation, the proposed deployment configuration of the software code is checked-in based at least on receipt of the approval 672.

As shown in FIG. 5, the method of flowchart 500 begins at step 502. In step 502, a response to the recommendation (e.g., recommendation 344), which is caused to be provided at step 210, is received. The response includes an instruction to change the attribute of the proposed deployment configuration (e.g., proposed deployment configuration 326) to have the second value in lieu of the first value. In an example implementation, the configuration conversion logic 658 receives a response 674 to the recommendation. The response 674 includes an instruction 676 to change the attribute of the proposed deployment configuration to have the second value in lieu of the first value.

At step 504, the proposed deployment configuration is converted into an updated deployment configuration by changing the attribute of the proposed deployment configuration to have the second value in lieu of the first value. In an example implementation, the configuration conversion logic 658 converts the proposed deployment configuration into an updated deployment configuration 668 by changing the attribute of the proposed deployment configuration to have the second value in lieu of the first value.

At step 506, the software program (e.g., software program 109) having the updated deployment configuration is deployed. In an example implementation, the deployment logic 660 deploys the software program having the updated deployment configuration.

Figure 7:
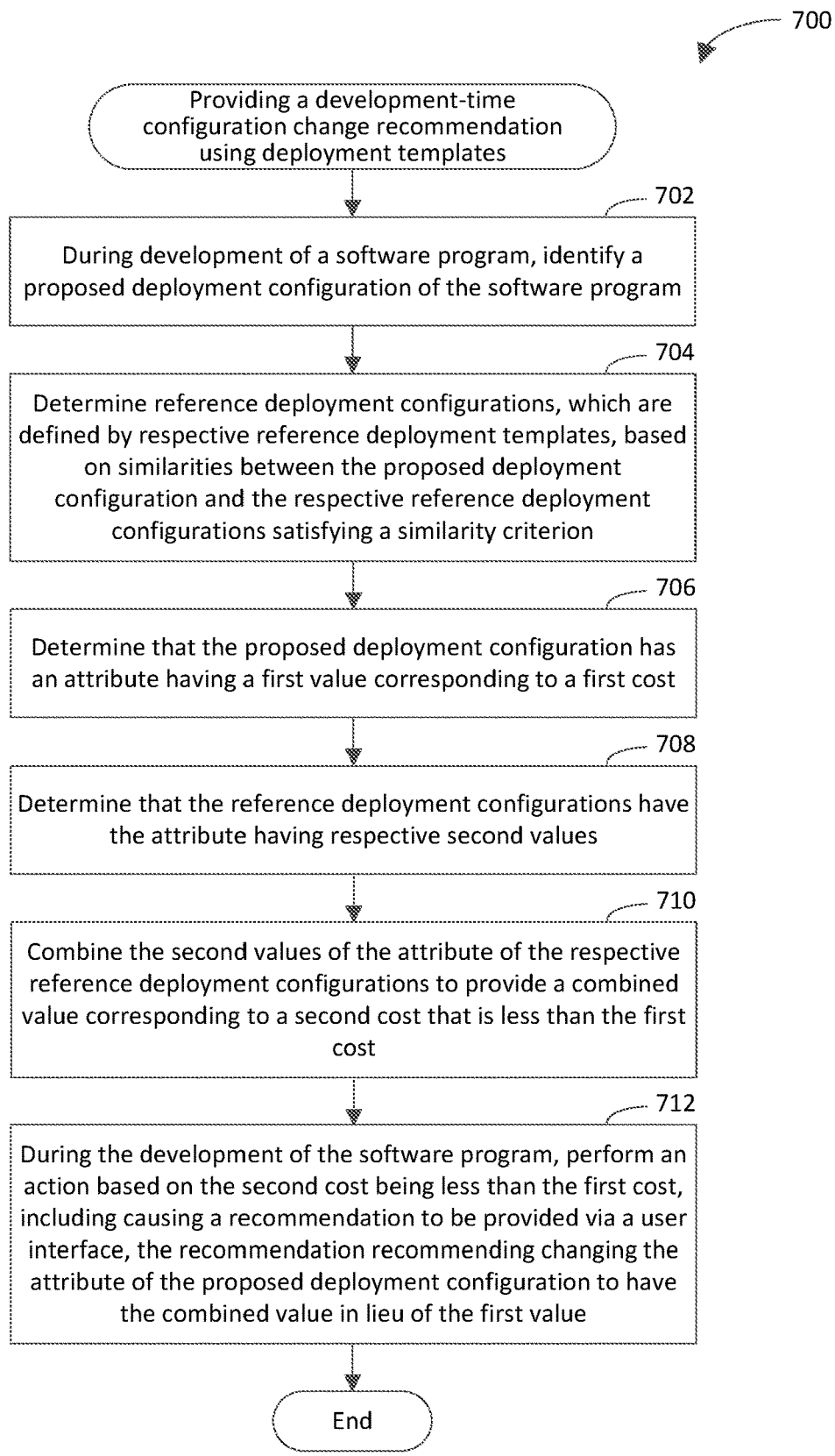

FIG. 7 depicts a flowchart 700 of another example method for providing a development-time configuration change recommendation using deployment templates in accordance with an embodiment. Flowchart 700 may be performed by the first server(s) 106A shown in FIG. 1, for example. For illustrative purposes, flowchart 700 is described with respect to the computing system 300 shown in FIG. 3. Further structural and operational embodiments will be apparent to persons skilled in the relevant art(s) based on the discussion regarding flowchart 700.

As shown in FIG. 7, the method of flowchart 700 begins at step 702. In step 702, during development of a software program, a proposed deployment configuration of the software program is identified. The proposed deployment configuration defines a state of the software program. For example, the proposed deployment configuration may include values of respective attributes of the software program that define the state. In accordance with this example, the values of the respective attributes may indicate a workload of the software program and/or one or more requirements of the software program (e.g., regarding resources of a cloud service). The workload indicates an extent to which the software program is used by users. The requirements may indicate amounts of cloud resources that are to be available for use by the software program. For instance, any one or more of the requirements may indicate an amount of a particular type of cloud resource that is to be available for use by the software program. Examples of a requirement of the software program are described in further detail above with regard to step 202 of FIG. 2. In an example implementation, during development of a software program (e.g., software program 109), the similarity logic 312 identifies a proposed deployment configuration 326 of the software program. In accordance with this implementation, the similarity logic 312 generates proposed configuration information 330, which indicates (e.g., specifies) the values of the respective attributes that are included in the proposed deployment configuration 326.

In an example embodiment, identifying the proposed deployment configuration at step 702 includes reviewing a pre-existing deployment template that defines the proposed deployment configuration of the software program. For instance, the pre-existing deployment template may include default settings and/or user-defined settings that define the proposed deployment configuration.

In another example embodiment, identifying the proposed deployment configuration at step 702 includes presenting a questionnaire, which includes questions requesting information that defines the proposed deployment configuration of the software program. For example, the questions may request a user to select values of respective attributes of the software program. In accordance with this example, each question may request the user to select a value from multiple possible values of a respective attribute. In accordance with this embodiment, identifying the proposed deployment configuration at step 702 further includes reviewing a response to the questionnaire, which includes answers to the questions, the answers including the information that defines the proposed deployment configuration of the software program. For example, the answers may include the value that is selected from the multiple possible values for each attribute.

At step 704, reference deployment configurations, which are defined by respective reference deployment templates, are determined based at least on similarities between the proposed deployment configuration and the respective reference deployment configurations satisfying a similarity criterion. For example, each reference deployment configuration may include values of respective attributes, such as any one or more of the attributes described above with respect to the proposed deployment configuration. In an example implementation, the similarity logic 312 determining reference deployment configurations 336, which are defined by respective reference deployment templates 334, based at least on similarities between the proposed deployment configuration 326 and the respective reference deployment configurations 336 satisfying a similarity criterion. In an aspect of this implementation, the similarity logic 312 retrieves the reference deployment configurations 336 from the store 310 and analyzes the reference deployment configurations to identify values of the respective attributes that are included in each of the reference deployment configurations 336. In accordance with this aspect, the similarity logic 312 generates reference configuration information 332, which indicates the values of the respective attributes that are included in each of the reference deployment configurations 336.

At step 706, a determination is made that the proposed deployment configuration has an attribute having a first value corresponding to a first cost. In an example implementation, the first attribute logic 314 determines that the proposed deployment configuration 326 has the attribute having the first value corresponding to the first cost. In accordance with this implementation, the first attribute logic 314 generates first attribute information 340, which indicates the attribute, the first value, and the first cost.

At step 708, a determination is made that the reference deployment configurations have the attribute having respective second values. The second values correspond to respective costs. In an example implementation, the second attribute logic 316 determines that the reference deployment configurations 336 have the attribute having the respective second values corresponding to the respective identified costs. In accordance with this implementation, the second attribute logic 316 generates second attribute information 342, which indicates the attribute, the second values, and the costs to which the respective second values correspond.

At step 710, the second values of the attribute of the respective reference deployment configurations are combined to provide a combined value corresponding to a second cost that is less than the first cost. In an example implementation, the value combining logic 320 combines the second values of the attribute of the respective reference deployment configurations, as indicated by the second attribute information 342, to provide the combined value corresponding to the second cost. The value combining logic 320 may determine the second cost by combining the costs to which the respective second values correspond, as indicated by the second attribute information 342. The value combining logic 320 generates combined value information 338 to indicate the combined value and the second cost.

At step 712, during the development of the software program, an action is performed based at least on the second cost being less than the first cost. Performing the action at step 712 includes causing a recommendation to be provided via a user interface. The recommendation recommends changing the attribute of the proposed deployment configuration to have the combined value in lieu of the first value. In an example implementation, during the development of the software program, the action logic 318 performs the action based at least on the second cost being less than the first cost. For instance, the performance logic 322 in the action logic 318 may compare the first cost, as indicated by the first attribute information 340, and the second cost, as indicated by the combined value information 338, to determine that the second cost is less than the first cost. In accordance with this implementation, the performance logic 322 causes a recommendation 344 to be provided via the user interface. The recommendation 344 recommends changing the attribute of the proposed deployment configuration 326 to have the combined value in lieu of the first value.

In an example embodiment, performing the action at step 712 includes causing a notification to be provided via the user interface. The notification specifies an amount of cost to be saved by changing the attribute of the proposed deployment configuration to have the combined value in lieu of the first value. In accordance with this embodiment, the amount of cost to be saved is based at least on the first cost minus the second cost. For instance, the amount of the cost may be equal to the first cost minus the second cost.

In another example embodiment, the action is performed at step 712 based at least on a cost of the proposed deployment configuration of the software program being greater than or equal to a user-defined cost threshold.

In yet another example embodiment, the action is performed at step 712 in a context of a developer tool in which the software program is developed. For example, the developer tool may be an IDE or a web development program.

In still another example embodiment, causing the recommendation to be provided at step 712 includes sending the recommendation via a cellular communication channel to be provided via the user interface of a mobile device outside a context of a developer tool in which the software program is developed. In another example embodiment, causing the recommendation to be provided at step 712 includes sending the recommendation via an email service to be provided via the user interface outside a context of a developer tool in which the software program is developed.

In yet another example embodiment, combining the second values at step 710 includes calculating an average of the second values of the attribute of the respective reference deployment configurations to provide an average value. In accordance with this embodiment, the recommendation recommends changing the attribute of the proposed deployment configuration to have the average value in lieu of the first value. In still another example embodiment, combining the second values at step 710 includes calculating a mode of the second values of the attribute of the respective reference deployment configurations to provide a mode value. In accordance with this embodiment, the recommendation recommends changing the attribute of the proposed deployment configuration to have the mode value in lieu of the first value. In an aspect of this embodiment, the recommendation recommends changing the attribute of the proposed deployment configuration to have the mode value in lieu of the first value based at least on a proportion of the second values that equal the mode value being greater than or equal to a proportion threshold.

It will be recognized that a cost associated with the proposed deployment configuration of the software program (including costs associated with values of its attributes) may be continuously monitored as the software program is being developed. Accordingly, any one or more of the steps 702, 704, 706, 708, 710, and/or 712 of flowchart 700 may be performed in an iterative manner as a result of the continuous monitoring.

In some example embodiments, one or more steps 702, 704, 706, 708, 710, and/or 712 of flowchart 700 may not be performed. Moreover, steps in addition to or in lieu of steps 702, 704, 706, 708, 710, and/or 712 may be performed. For instance, in an example embodiment, the method of flowchart 700 further includes detecting an instruction to deploy the proposed deployment configuration of the software program in a production environment. In an example implementation, the action logic 318 detects a deployment instruction 328, which indicates that the proposed deployment configuration 326 of the software program is to be deployed in the production environment. In accordance with this implementation, the action is performed at step 712 further based at least on detection of the instruction to deploy the proposed deployment configuration of the software program in the production environment. In an example implementation, the action logic 318 performs the action further based at least on detection of the deployment instruction 328 (e.g., based at least on the deployment instruction 328 indicating that the proposed deployment configuration 326 of the software program is to be deployed in the production environment).

In another example embodiment, performing the action at step 712 further includes one or more of the steps shown in flowchart 400 of FIG. 4, which is described in detail above.

Figure 8:
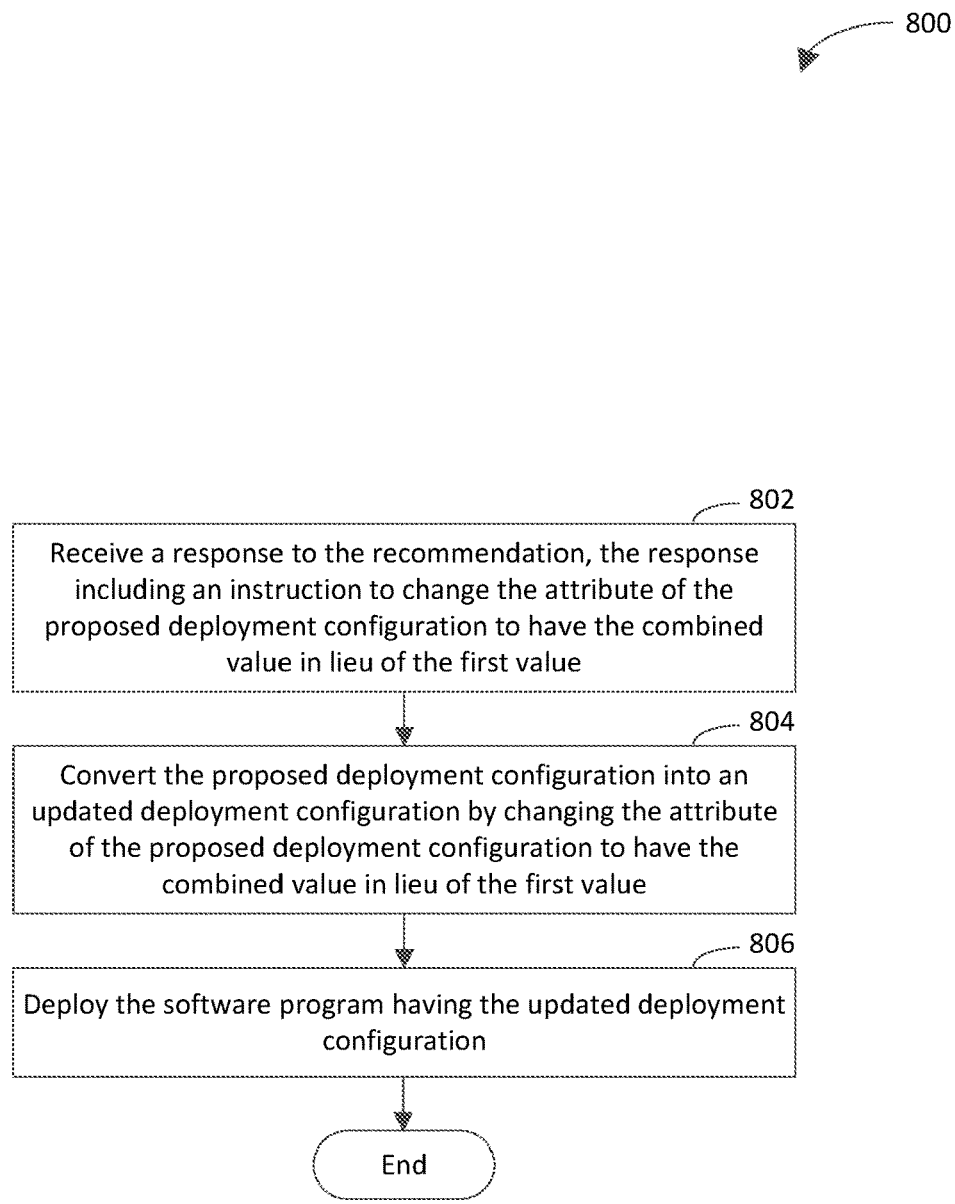

In yet another example embodiment, performing the action at step 712 further includes one or more of the steps shown in flowchart 800 of FIG. 8. Flowchart 800 may be performed by the action logic 318 shown in FIG. 3, for example. For illustrative purposes, flowchart 800 is described with respect to the action logic 600 shown in FIG. 6. Further structural and operational embodiments will be apparent to persons skilled in the relevant art(s) based on the discussion regarding flowchart 800.

As shown in FIG. 8, the method of flowchart 800 begins at step 802. In step 802, a response to the recommendation (e.g., recommendation 344), which is caused to be provided at step 712, is received. The response includes an instruction to change the attribute of the proposed deployment configuration (e.g., proposed deployment configuration 326) to have the combined value in lieu of the first value. In an example implementation, the configuration conversion logic 658 receives a response 674 to the recommendation. The response 674 includes an instruction 676 to change the attribute of the proposed deployment configuration to have the combined value in lieu of the first value.

At step 804, the proposed deployment configuration is converted into an updated deployment configuration by changing the attribute of the proposed deployment configuration to have the combined value in lieu of the first value. In an example implementation, the configuration conversion logic 658 converts the proposed deployment configuration into an updated deployment configuration 668 by changing the attribute of the proposed deployment configuration to have the combined value in lieu of the first value.

At step 806, the software program (e.g., software program 109) having the updated deployment configuration is deployed. In an example implementation, the deployment logic 660 deploys the software program having the updated deployment configuration.

It will be recognized that the computing system 300 may not include one or more of the template-based development-time recommendation logic 308, the store 310, the similarity logic 312, the first attribute logic 314, the second attribute logic 316, the action logic 318, the value combining logic 320, and/or the performance logic 322. Furthermore, the computing system 300 may include components in addition to or in lieu of the template-based development-time recommendation logic 308, the store 310, the similarity logic 312, the first attribute logic 314, the second attribute logic 316, the action logic 318, the value combining logic 320, and/or the performance logic 322.

It will be further recognized that the action logic 600 may not include one or more of the check-in detection logic 652, the check-in blocking logic 654, the check-in execution logic 656, the configuration conversion logic 658, and/or the deployment logic 660. Furthermore, the action logic 600 may include components in addition to or in lieu of the check-in detection logic 652, the check-in blocking logic 654, the check-in execution logic 656, the configuration conversion logic 658, and/or the deployment logic 660.

FIG. 9 depicts an example deployment template 900 in accordance with an embodiment. The deployment template 900 may define a proposed deployment configuration of a software application or a reference deployment configuration. The deployment template 900 identifies functions 902, variables 904, and resources 906. Each resource has a name 908, a type 910, an application programming interface (API) version 912, tags 914, a location 916, a kind 918, a stock keeping unit (SKU) 920, and properties 926. The SKU 920 includes a name 922 and a tier 924. The deployment template 900 is provided for illustrative purposes and is not intended to be limiting. The deployment template 900 may have any suitable format and may include any suitable information.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the template-based development-time recommendation logic 108, the template-based development-time recommendation logic 308, the similarity logic 312, the first attribute logic 314, the second attribute logic 316, the action logic 318, the value combining logic 320, the performance logic 322, the action logic 660, the check-in detection logic 652, the check-in blocking logic 654, the check-in execution logic 656, the configuration conversion logic 658, the deployment logic 660, flowchart 200, flowchart 400, flowchart 500, flowchart 700, and/or flowchart 800 may be implemented in hardware, software, firmware, or any combination thereof.

For example, any one or more of the template-based development-time recommendation logic 108, the template-based development-time recommendation logic 308, the similarity logic 312, the first attribute logic 314, the second attribute logic 316, the action logic 318, the value combining logic 320, the performance logic 322, the action logic 660, the check-in detection logic 652, the check-in blocking logic 654, the check-in execution logic 656, the configuration conversion logic 658, the deployment logic 660, flowchart 200, flowchart 400, flowchart 500, flowchart 700, and/or flowchart 800 may be implemented, at least in part, as computer program code configured to be executed in one or more processors.

In another example, any one or more of the template-based development-time recommendation logic 108, the template-based development-time recommendation logic 308, the similarity logic 312, the first attribute logic 314, the second attribute logic 316, the action logic 318, the value combining logic 320, the performance logic 322, the action logic 660, the check-in detection logic 652, the check-in blocking logic 654, the check-in execution logic 656, the configuration conversion logic 658, the deployment logic 660, flowchart 200, flowchart 400, flowchart 500, flowchart 700, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
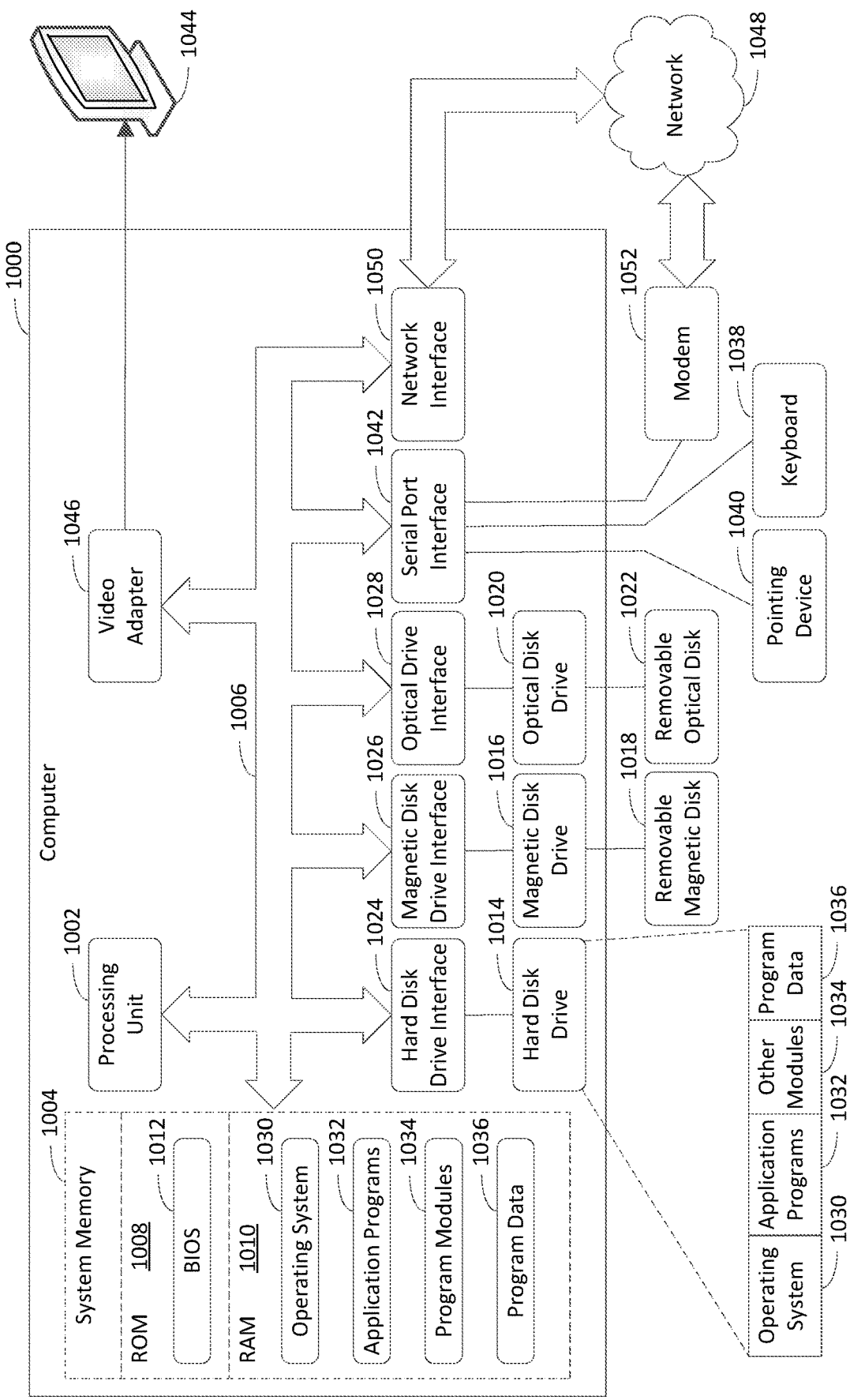
FIG. 10 depicts an example computer in which embodiments may be implemented.

II. Further Discussion of Some Example Embodiments (A1) An example system (FIG. 1, 102A-102M, 106A-106N; FIG. 3, 300; FIG. 10, 1000) comprises memory (FIG. 10, 1004, 1008, 1010) and a processing system (FIG. 10, 1002) coupled to the memory. The processing system is configured to, during development of a software program (FIG. 1, 109), identify (FIG. 2, 202) a proposed deployment configuration (FIG. 3, 326) of the software program. The processing system is further configured to determine (FIG. 2, 204) a reference deployment configuration (FIG. 3, 336), which is defined by a reference deployment template (FIG. 3, 334), based at least on a similarity between the proposed deployment configuration and the reference deployment configuration satisfying a similarity criterion. The processing system is further configured to determine (FIG. 2, 206) that the proposed deployment configuration has an attribute having a first value corresponding to a first cost. The processing system is further configured to determine (FIG. 2, 208) that the reference deployment configuration has the attribute having a second value corresponding to a second cost that is less than the first cost. The processing system is further configured to, during the development of the software program, perform (FIG. 2, 210) an action based at least on the second cost being less than the first cost, wherein performance of the action includes causing a recommendation (FIG. 3, 344) to be provided via a user interface, the recommendation recommending changing the attribute of the proposed deployment configuration to have the second value in lieu of the first value.

(A2) In the example system of A1, wherein the processing system is configured to: identify the proposed deployment configuration by reviewing a pre-existing deployment template that defines the proposed deployment configuration of the software program.

(A3) In the example system of any of A1-A2, wherein the processing system is configured to: identify the proposed deployment configuration by performing the following operations: present a questionnaire, which includes questions requesting information that defines the proposed deployment configuration of the software program; and review a response to the questionnaire, which includes answers to the questions, the answers including the information that defines the proposed deployment configuration of the software program.

(A4) In the example system of any of A1-A3, wherein the processing system is configured to: cause a notification to be provided via the user interface, the notification specifying an amount of cost to be saved by changing the attribute of the proposed deployment configuration to have the second value in lieu of the first value; and wherein the amount of cost to be saved to be saved is based at least on the first cost minus the second cost.

(A5) In the example system of any of A1-A4, wherein the processing system is configured to: detect an attempt of a first user to check-in the proposed deployment configuration of the software code; block the attempt to check-in the proposed deployment configuration of the software code; provide a request to a second user, the request requesting approval of the check-in of the proposed deployment configuration of the software code; receive the approval of the check-in of the proposed deployment configuration of the software code; and based at least on receipt of the approval, check-in the proposed deployment configuration of the software code.

(A6) In the example system of any of A1-A5, wherein the processing system is configured to: detect an instruction to deploy the proposed deployment configuration of the software program in a production environment; and perform the action further based at least on detection of the instruction to deploy the proposed deployment configuration of the software program in the production environment.

(A7) In the example system of any of A1-A6, wherein the processing system is configured to: receive a response to the recommendation, the response including an instruction to change the attribute of the proposed deployment configuration to have the second value in lieu of the first value; convert the proposed deployment configuration into an updated deployment configuration by changing the attribute of the proposed deployment configuration to have the second value in lieu of the first value; and deploy the software program having the updated deployment configuration.

(A8) In the example system of any of A1-A7, wherein the processing system is configured to: perform the action based at least on a cost of the proposed deployment configuration of the software program being greater than or equal to a user-defined cost threshold.

(A9) In the example system of any of A1-A8, wherein the processing system is configured to: perform the action in a context of a developer tool in which the software program is developed.

(A10) In the example system of any of A1-A9, wherein the processing system is configured to: send the recommendation via a cellular communication channel to be provided via the user interface of a mobile device outside a context of a developer tool in which the software program is developed.

(A11) In the example system of any of A1-A10, wherein the processing system is configured to: send the recommendation via an email service to be provided via the user interface outside a context of a developer tool in which the software program is developed.

(B1) An example method is implemented by a computing system (FIG. 1, 102A-102M, 106A-106N; FIG. 3, 300; FIG. 10, 1000). The method comprises, during development of a software program (FIG. 1, 109), identifying (FIG. 7, 702) a proposed deployment configuration (FIG. 3, 326) of the software program. The method further comprises determining (FIG. 7, 704) reference deployment configurations (FIG. 3, 336), which are defined by respective reference deployment templates (FIG. 3, 334), based at least on similarities between the proposed deployment configuration and the respective reference deployment configurations satisfying a similarity criterion. The method further comprises determining (FIG. 7, 706) that the proposed deployment configuration has an attribute having a first value corresponding to a first cost. The method further comprises determining (FIG. 7, 708) that the reference deployment configurations have the attribute having respective second values. The method further comprises combining (FIG. 7, 710) the second values of the attribute of the respective reference deployment configurations to provide a combined value corresponding to a second cost that is less than the first cost. The method further comprises, during the development of the software program, performing (FIG. 7, 712) an action based at least on the second cost being less than the first cost, said performing the action including causing a recommendation (FIG. 3, 344) to be provided via a user interface, the recommendation recommending changing the attribute of the proposed deployment configuration to have the combined value in lieu of the first value.

(B2) In the method of B1, wherein combining the second values of the attribute of the respective reference deployment configurations comprises: calculating an average of the second values of the attribute of the respective reference deployment configurations to provide an average value; and wherein the recommendation recommends changing the attribute of the proposed deployment configuration to have the average value in lieu of the first value.

(B3) In the method of any of B1-B2, wherein combining the second values of the attribute of the respective reference deployment configurations comprises: calculating a mode of the second values of the attribute of the respective reference deployment configurations to provide a mode value; and wherein the recommendation recommends changing the attribute of the proposed deployment configuration to have the mode value in lieu of the first value.

(B4) In the method of any of B1-B3, wherein the recommendation recommends changing the attribute of the proposed deployment configuration to have the mode value in lieu of the first value based at least on a proportion of the second values that equal the mode value being greater than or equal to a proportion threshold.

(B5) In the method of any of B1-B4, wherein identifying the proposed deployment configuration comprises: reviewing a pre-existing deployment template that defines the proposed deployment configuration of the software program.

(B6) In the method of any of B1-B5, wherein identifying the proposed deployment configuration comprises: presenting a questionnaire, which includes questions requesting information that defines the proposed deployment configuration of the software program; and reviewing a response to the questionnaire, which includes answers to the questions, the answers including the information that defines the proposed deployment configuration of the software program.

(B7) In the method of any of B1-B6, wherein performing the action further includes: causing a notification to be provided via the user interface, the notification specifying an amount of cost to be saved by changing the attribute of the proposed deployment configuration to have the combined value in lieu of the first value; and wherein the amount of cost to be saved is based at least on the first cost minus the second cost.

(B8) In the method of any of B1-B7, wherein performing the action further includes: detecting an attempt of a first user to check-in the proposed deployment configuration of the software code; blocking the attempt to check-in the proposed deployment configuration of the software code; providing a request to a second user, the request requesting approval of the check-in of the proposed deployment configuration of the software code; receiving the approval of the check-in of the proposed deployment configuration of the software code; and based at least on receipt of the approval, checking-in the proposed deployment configuration of the software code.

(C1) An example computer program product (FIG. 10, 1018, 1022) comprising a computer-readable storage medium having instructions recorded thereon for enabling a processor-based system (FIG. 1, 102A-102M, 106A-106N; FIG. 3, 300; FIG. 10, 1000) to perform operations. The operations comprise, during development of a software program (FIG. 1, 109), identifying (FIG. 2, 202) a proposed deployment configuration (FIG. 3, 326) of the software program. The operations further comprise determining (FIG. 2, 204) a reference deployment configuration (FIG. 3, 336), which is defined by a reference deployment template (FIG. 3, 334), based at least on a similarity between the proposed deployment configuration and the reference deployment configuration satisfying a similarity criterion. The operations further comprise determining (FIG. 2, 206) that the proposed deployment configuration has an attribute having a first value corresponding to a first cost. The operations further comprise determining (FIG. 2, 208) that the reference deployment configuration has the attribute having a second value corresponding to a second cost that is less than the first cost. The operations further comprise, during the development of the software program, performing (FIG. 2, 210) an action based at least on the second cost being less than the first cost, said performing the action including causing a recommendation (FIG. 3, 344) to be provided via a user interface, the recommendation recommending changing the attribute of the proposed deployment configuration to have the second value in lieu of the first value.

III. Example Computer System

FIG. 10 depicts an example computer 1000 in which embodiments may be implemented. Any one or more of the user devices 102A-102M and/or any one or more of the servers 106A-106N shown in FIG. 1 and/or computing system 300 shown in FIG. 3 may be implemented using computer 1000, including one or more features of computer 1000 and/or alternative features. Computer 1000 may be a general-purpose computing device in the form of a conventional personal computer, a mobile computer, or a workstation, for example, or computer 1000 may be a special purpose computing device. The description of computer 1000 provided herein is provided for purposes of illustration, and is not intended to be limiting. Embodiments may be implemented in further types of computer systems, as would be known to persons skilled in the relevant art(s).

As shown in FIG. 10, computer 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic for implementing any one or more of (e.g., at least a portion of) the template-based development-time recommendation logic 108, the template-based development-time recommendation logic 308, the similarity logic 312, the first attribute logic 314, the second attribute logic 316, the action logic 318, the value combining logic 320, the performance logic 322, the action logic 660, the check-in detection logic 652, the check-in blocking logic 654, the check-in execution logic 656, the configuration conversion logic 658, the deployment logic 660, flowchart 200 (including any step of flowchart 200), flowchart 400 (including any step of flowchart 400), flowchart 500 (including any step of flowchart 500), flowchart 700 (including any step of flowchart 700), and/or flowchart 800 (including any step of flowchart 800), as described herein.

A user may enter commands and information into the computer 1000 through input devices such as keyboard 1038 and pointing device 1040. Other input devices (not shown) may include a microphone, joystick, game pad, satellite dish, scanner, touch screen, camera, accelerometer, gyroscope, or the like. These and other input devices are often connected to the processing unit 1002 through a serial port interface 1042 that is coupled to bus 1006, but may be connected by other interfaces, such as a parallel port, game port, or a universal serial bus (USB).

A display device 1044 (e.g., a monitor) is also connected to bus 1006 via an interface, such as a video adapter 1046. In addition to display device 1044, computer 1000 may include other peripheral output devices (not shown) such as speakers and printers.

Computer 1000 is connected to a network 1048 (e.g., the Internet) through a network interface or adapter 1050, a modem 1052, or other means for establishing communications over the network. Modem 1052, which may be internal or external, is connected to bus 1006 via serial port interface 1042.

As used herein, the terms "computer program medium" and "computer-readable storage medium" are used to generally refer to media (e.g., non-transitory media) such as the hard disk associated with hard disk drive 1014, removable magnetic disk 1018, removable optical disk 1022, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed or loaded by an application, enable computer 1000 to implement features of embodiments discussed herein. Accordingly, such computer programs represent controllers of the computer 1000.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like. It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   a processing system coupled to the memory, the processing system configured to:
   during development of a software program, identify a proposed deployment configuration of the software program;
   determine a reference deployment configuration, which is defined by a reference deployment template, based at least on a similarity between the proposed deployment configuration and the reference deployment configuration satisfying a similarity criterion;
   determine that the proposed deployment configuration has an attribute having a first value corresponding to a first cost;
   determine that the reference deployment configuration has the attribute having a second value corresponding to a second cost that is less than the first cost; and
   during the development of the software program, perform an action based at least on the second cost being less than the first cost, wherein performance of the action includes causing a recommendation to be provided via a user interface, the recommendation recommending changing the attribute of the proposed deployment configuration to have the second value in lieu of the first value.

2. The system of claim 1, wherein the processing system is configured to:
   identify the proposed deployment configuration by reviewing a pre-existing deployment template that defines the proposed deployment configuration of the software program.

3. The system of claim 1, wherein the processing system is configured to:
   identify the proposed deployment configuration by performing the following operations:
   present a questionnaire, which includes questions requesting information that defines the proposed deployment configuration of the software program; and
   review a response to the questionnaire, which includes answers to the questions, the answers including the information that defines the proposed deployment configuration of the software program.

4. The system of claim 1, wherein the processing system is configured to:
   cause a notification to be provided via the user interface, the notification specifying an amount of cost to be saved by changing the attribute of the proposed deployment configuration to have the second value in lieu of the first value; and
   wherein the amount of cost to be saved to be saved is based at least on the first cost minus the second cost.

5. The system of claim 1, wherein the processing system is configured to:
   detect an attempt of a first user to check-in the proposed deployment configuration of the software code;
   block the attempt to check-in the proposed deployment configuration of the software code;
   provide a request to a second user, the request requesting approval of the check-in of the proposed deployment configuration of the software code;
   receive the approval of the check-in of the proposed deployment configuration of the software code; and
   based at least on receipt of the approval, check-in the proposed deployment configuration of the software code.

6. The system of claim 1, wherein the processing system is configured to:
   detect an instruction to deploy the proposed deployment configuration of the software program in a production environment; and
   perform the action further based at least on detection of the instruction to deploy the proposed deployment configuration of the software program in the production environment.

7. The system of claim 1, wherein the processing system is configured to:
   receive a response to the recommendation, the response including an instruction to change the attribute of the proposed deployment configuration to have the second value in lieu of the first value;
   convert the proposed deployment configuration into an updated deployment configuration by changing the attribute of the proposed deployment configuration to have the second value in lieu of the first value; and
   deploy the software program having the updated deployment configuration.

8. The system of claim 1, wherein the processing system is configured to:
   perform the action based at least on a cost of the proposed deployment configuration of the software program being greater than or equal to a user-defined cost threshold.

9. The system of claim 1, wherein the processing system is configured to:
   perform the action in a context of a developer tool in which the software program is developed.

10. The system of claim 1, wherein the processing system is configured to:
    send the recommendation via a cellular communication channel to be provided via the user interface of a mobile device outside a context of a developer tool in which the software program is developed.

11. The system of claim 1, wherein the processing system is configured to:
    send the recommendation via an email service to be provided via the user interface outside a context of a developer tool in which the software program is developed.

12. A method implemented by a computing system, the method comprising:
    during development of a software program, identifying a proposed deployment configuration of the software program;

determining reference deployment configurations, which are defined by respective reference deployment templates, based at least on similarities between the proposed deployment configuration and the respective reference deployment configurations satisfying a similarity criterion;

determining that the proposed deployment configuration has an attribute having a first value corresponding to a first cost;

determining that the reference deployment configurations have the attribute having respective second values;

combining the second values of the attribute of the respective reference deployment configurations to provide a combined value corresponding to a second cost that is less than the first cost; and during the development of the software program, performing an action based at least on the second cost being less than the first cost, said performing the action including causing a recommendation to be provided via a user interface, the recommendation recommending changing the attribute of the proposed deployment configuration to have the combined value in lieu of the first value.

13. The method of claim 12, wherein combining the second values of the attribute of the respective reference deployment configurations comprises:

calculating an average of the second values of the attribute of the respective reference deployment configurations to provide an average value; and wherein the recommendation recommends changing the attribute of the proposed deployment configuration to have the average value in lieu of the first value.

14. The method of claim 12, wherein combining the second values of the attribute of the respective reference deployment configurations comprises:

calculating a mode of the second values of the attribute of the respective reference deployment configurations to provide a mode value; and wherein the recommendation recommends changing the attribute of the proposed deployment configuration to have the mode value in lieu of the first value.

15. The method of claim 14, wherein the recommendation recommends changing the attribute of the proposed deployment configuration to have the mode value in lieu of the first value based at least on a proportion of the second values that equal the mode value being greater than or equal to a proportion threshold.

16. The method of claim 12, wherein identifying the proposed deployment configuration comprises:

reviewing a pre-existing deployment template that defines the proposed deployment configuration of the software program.

17. The method of claim 12, wherein identifying the proposed deployment configuration comprises:

presenting a questionnaire, which includes questions requesting information that defines the proposed deployment configuration of the software program; and reviewing a response to the questionnaire, which includes answers to the questions, the answers including the information that defines the proposed deployment configuration of the software program.

18. The method of claim 12, wherein performing the action further includes:

causing a notification to be provided via the user interface, the notification specifying an amount of cost to be saved by changing the attribute of the proposed deployment configuration to have the combined value in lieu of the first value; and wherein the amount of cost to be saved is based at least on the first cost minus the second cost.

19. The method of claim 12, wherein performing the action further includes:

detecting an attempt of a first user to check-in the proposed deployment configuration of the software code;

blocking the attempt to check-in the proposed deployment configuration of the software code;

providing a request to a second user, the request requesting approval of the check-in of the proposed deployment configuration of the software code;

receiving the approval of the check-in of the proposed deployment configuration of the software code; and based at least on receipt of the approval, checking-in the proposed deployment configuration of the software code.

20. A computer program product comprising a computer-readable storage medium having instructions recorded thereon for enabling a processor-based system to perform operations, the operations comprising:

during development of a software program, identifying a proposed deployment configuration of the software program;

determining a reference deployment configuration, which is defined by a reference deployment template, based at least on a similarity between the proposed deployment configuration and the reference deployment configuration satisfying a similarity criterion;

determining that the proposed deployment configuration has an attribute having a first value corresponding to a first cost;

determining that the reference deployment configuration has the attribute having a second value corresponding to a second cost that is less than the first cost; and during the development of the software program, performing an action based at least on the second cost being less than the first cost, said performing the action including causing a recommendation to be provided via a user interface, the recommendation recommending changing the attribute of the proposed deployment configuration to have the second value in lieu of the first value.

* * * * *